No. 683,194. Patented Sept. 24, 1901.
J. BATH.
TOOL OR CUTTER GRINDING MACHINE.
(Application filed Dec. 31, 1900.)
(No Model.) 6 Sheets—Sheet 3.

WITNESSES:
A. A. Bonney.
E. P. Small.

INVENTOR:
John Bath,
By his Atty.
Henry Williams

No. 683,194. Patented Sept. 24, 1901.
J. BATH.
TOOL OR CUTTER GRINDING MACHINE.
(Application filed Dec. 31, 1900.)
(No Model.) 6 Sheets—Sheet 4.

WITNESSES:
A. N. Downey
E. P. Small

INVENTOR:
John Bath,
By his Atty.
Henry Williams

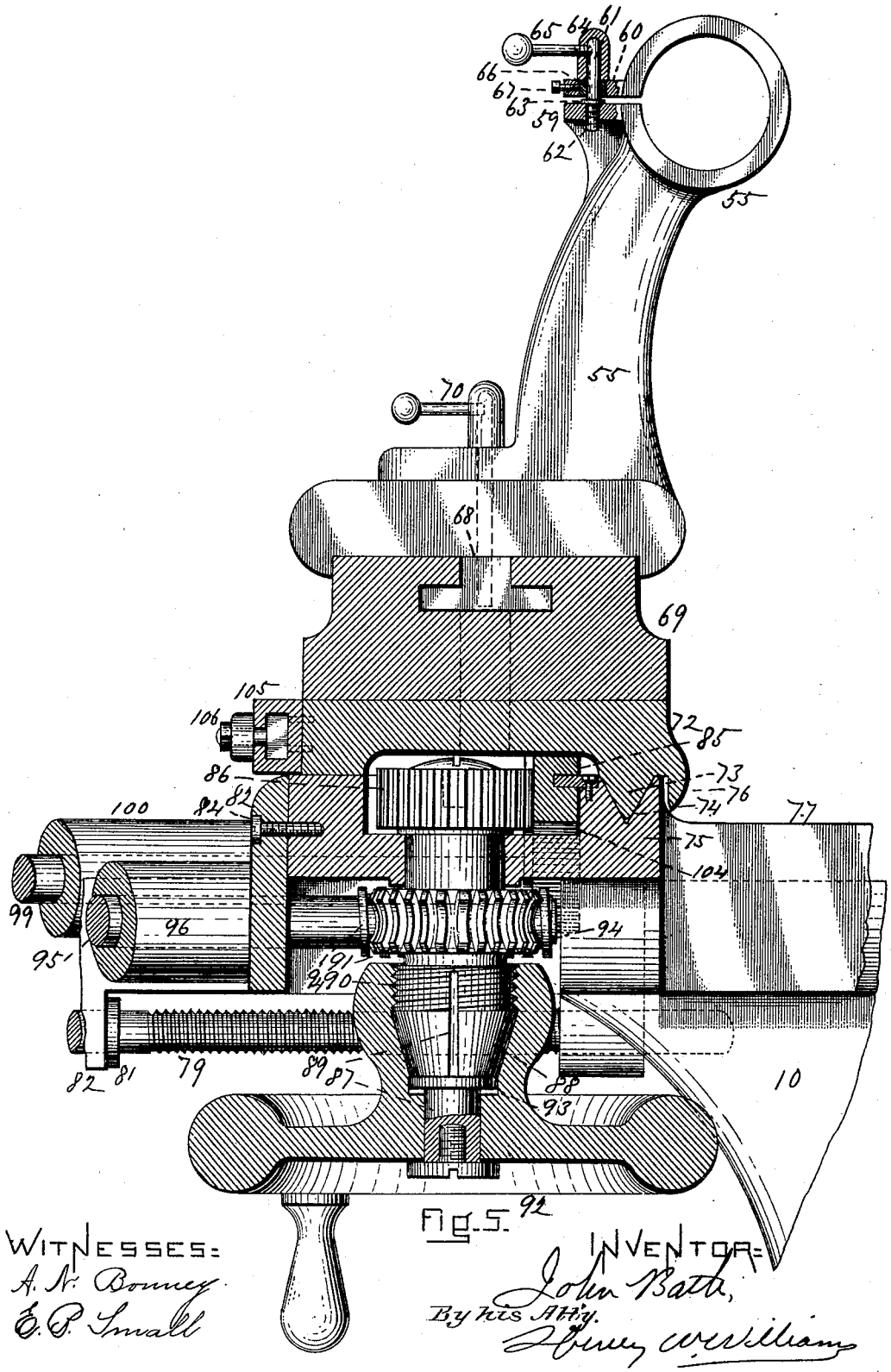

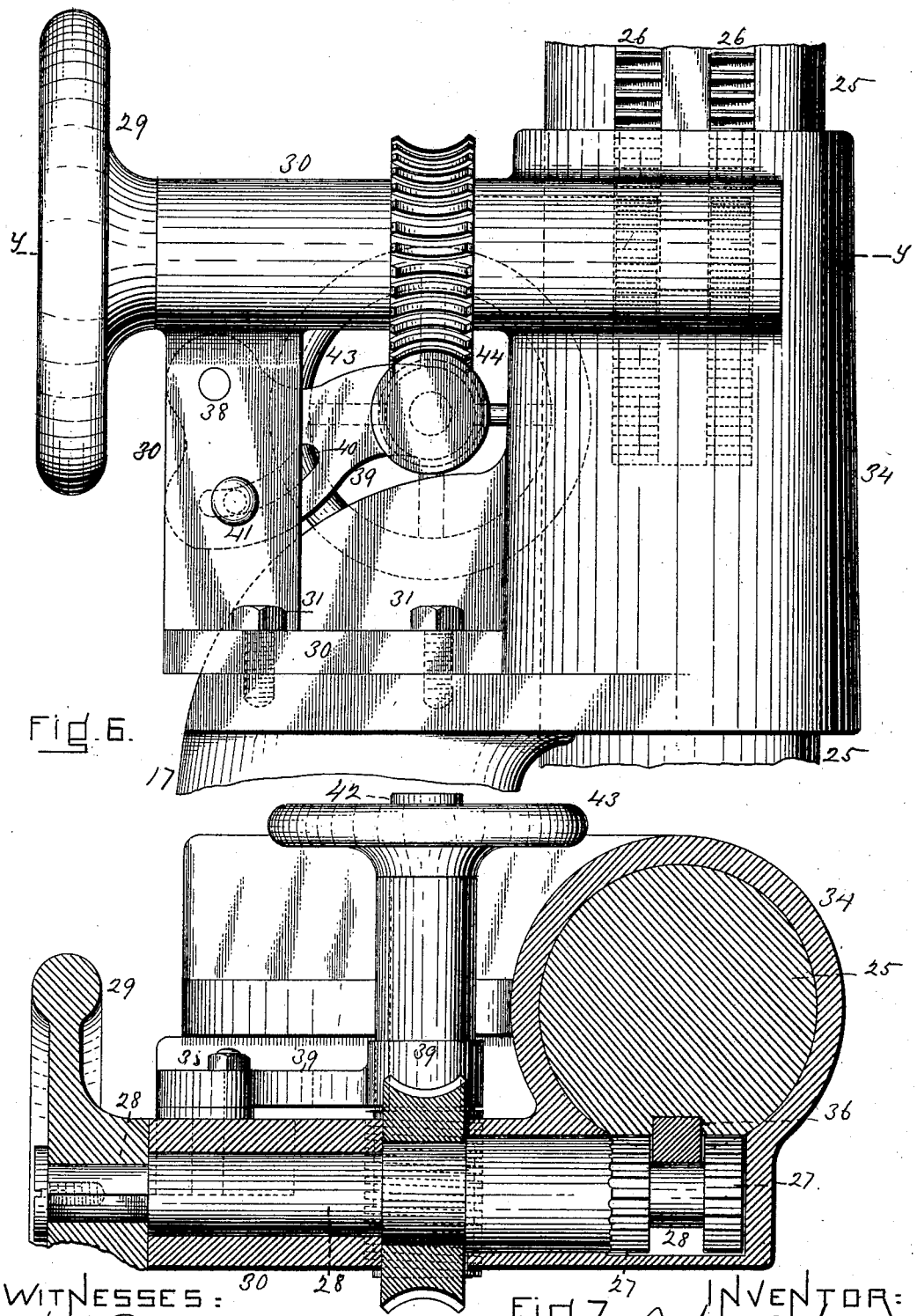

UNITED STATES PATENT OFFICE.

JOHN BATH, OF WALTHAM, MASSACHUSETTS.

TOOL OR CUTTER GRINDING MACHINE.

SPECIFICATION forming part of Letters Patent No. 683,194, dated September 24, 1901.

Application filed December 31, 1900. Serial No. 41,552. (No model.)

*To all whom it may concern:*

Be it known that I, JOHN BATH, a citizen of the United States, residing at Waltham, in the county of Middlesex and State of Massachusetts, have invented new and useful Improvements in Tool or Cutter Grinding Machines, of which the following is a specification.

This invention relates to that class of machines, commonly termed "universal tool and cutter grinders," for grinding tools, cutters, arbors, disks, gages, and many other articles and implements made of metal; and it relates particularly to different portions of the machine itself and not to the attachments for holding the tools or cutters to be ground.

The improvements consist in certain novel constructions and arrangements of parts whereby the table may be used so as to produce a slow and quick feed and an exact adjustment, whereby it can be run well off in either of two opposite directions without the loss of the use of the parts, whereby exposure of the "knee" to grit and dirt is prevented, whereby the parts of the machine for sustaining or controlling the grinding-wheels are rendered susceptible of a variety of adjustments while in motion with relation to the tool-holder, whereby the frame permits of the use of unusually large grinding-wheels having more contact on the work, whereby said wheels are held normally in a raised position above the work, and whereby the machine is rendered more efficient in other respects in its operation, all as fully described below, and illustrated in the accompanying drawings, in which—

Figure 1:
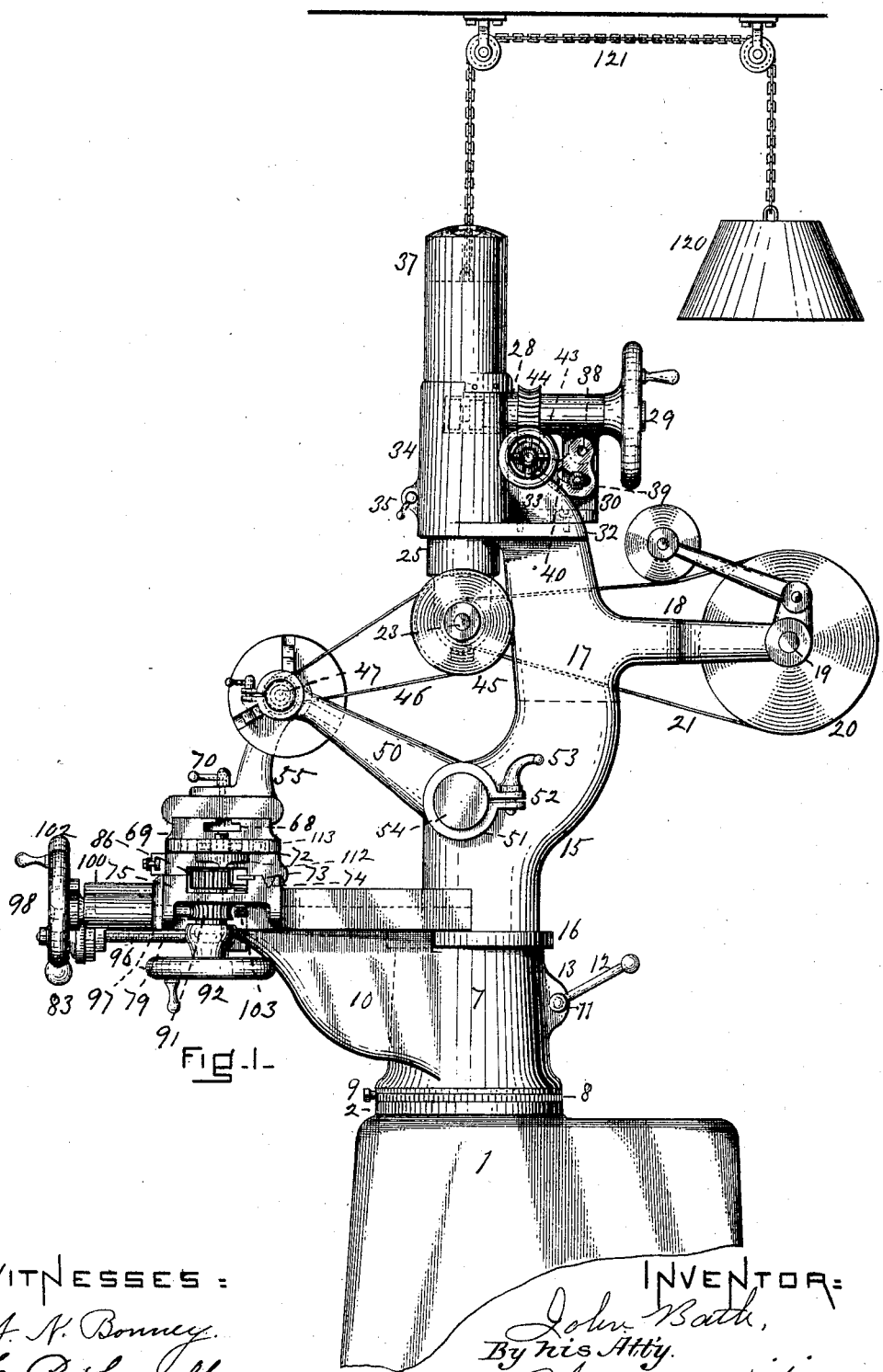
Figure 2:
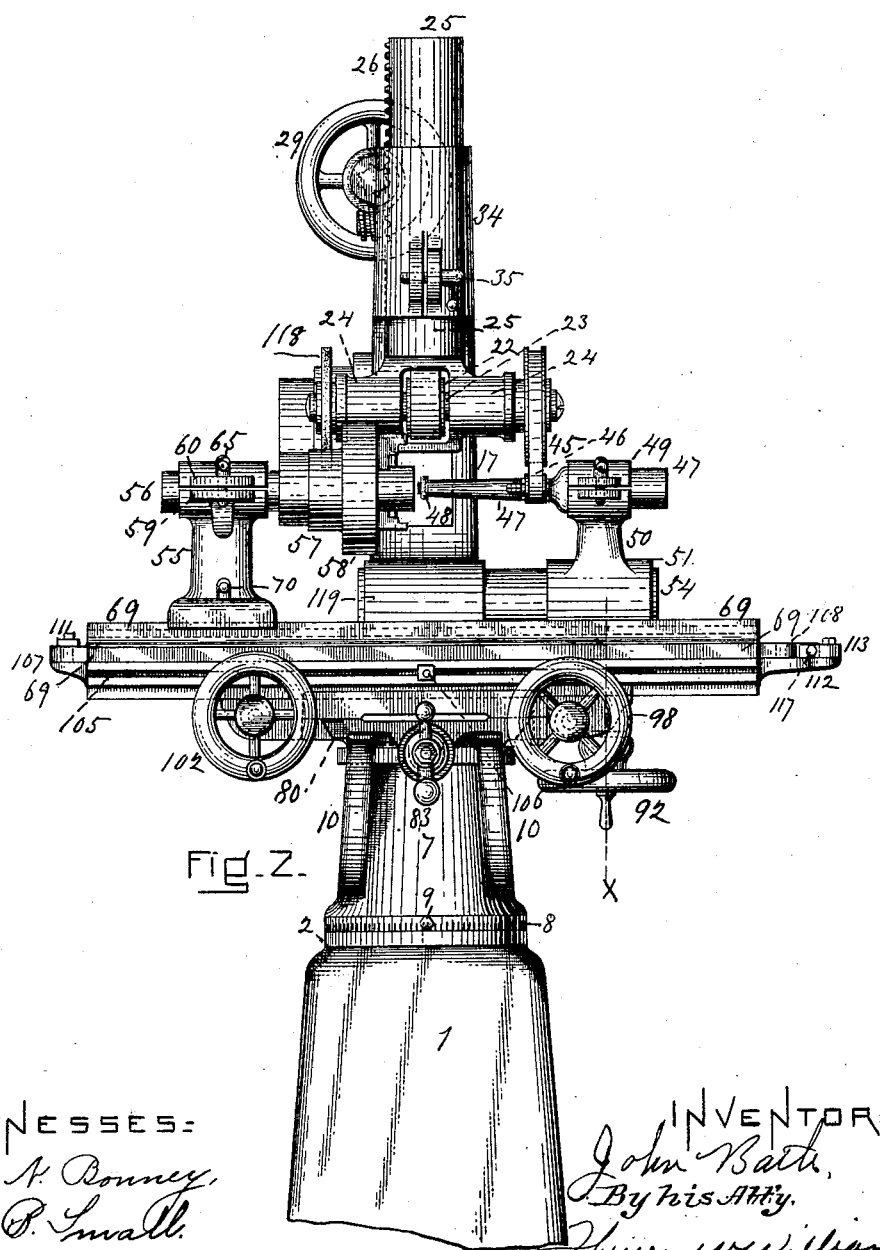
Figure 3:
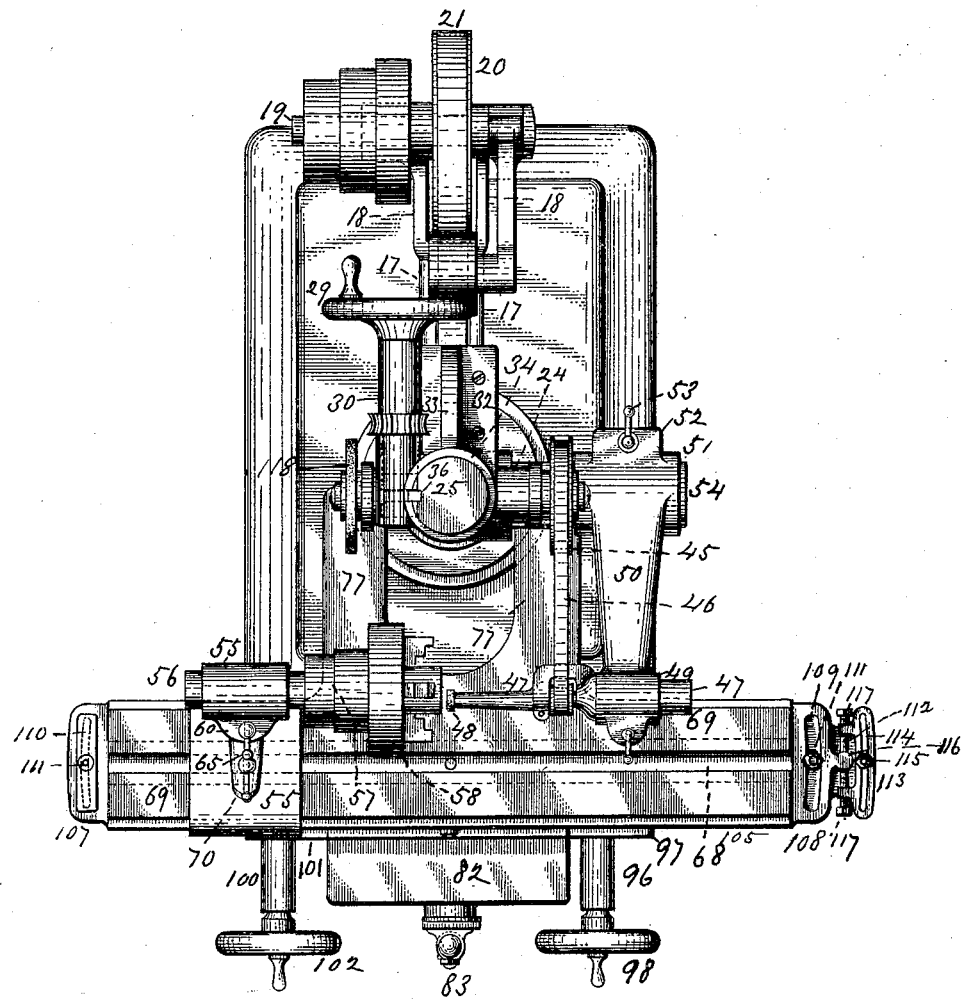
Figure 4:
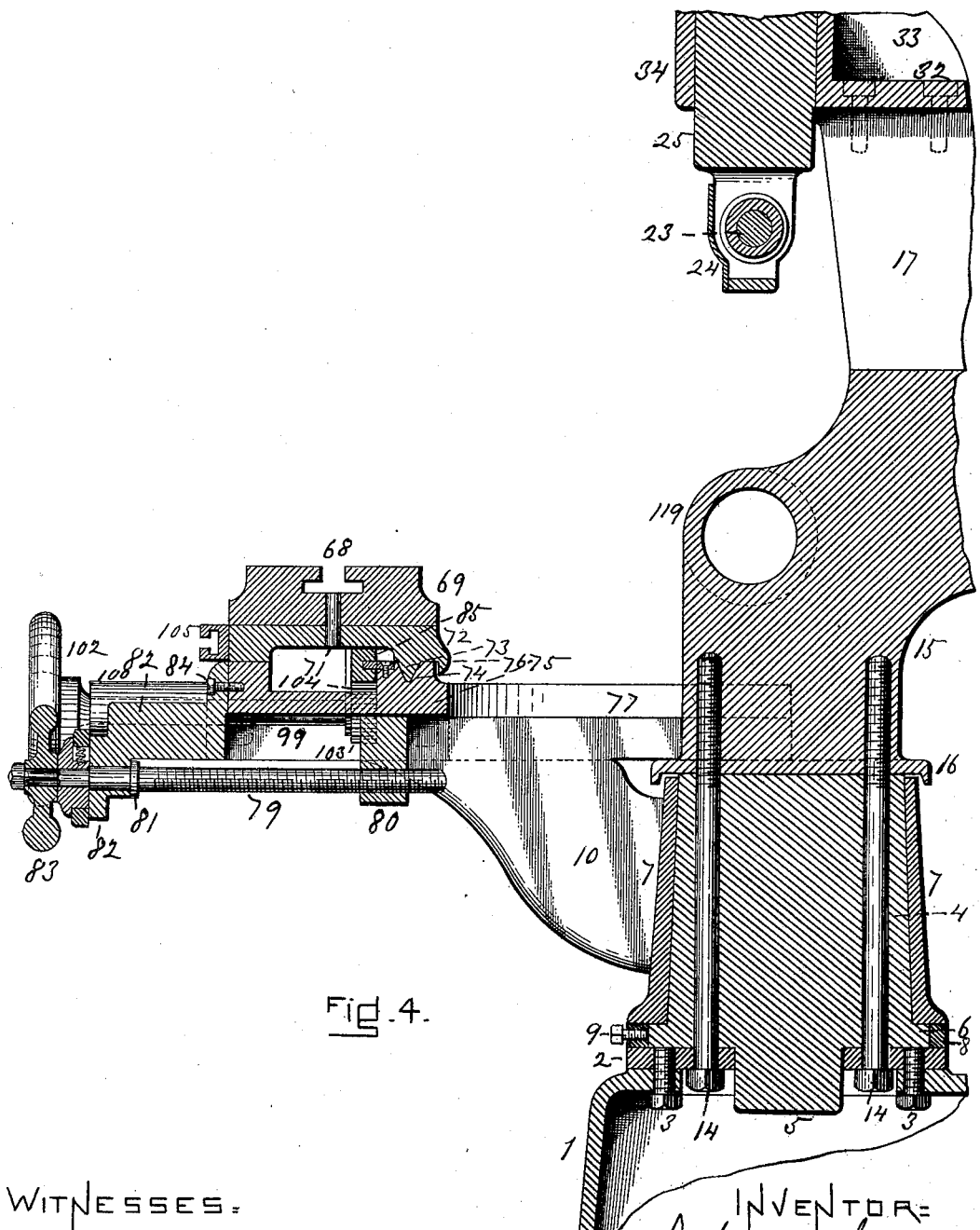

Figure 1 is a side elevation of my improved machine. Fig. 2 is a front elevation of the same with the dust-guard removed. Fig. 3 is a plan. Fig. 4 is a sectional view taken vertically and centrally through the machine. Fig. 5 is an enlarged sectional view taken on line X, Fig. 2. Fig. 6 is an enlarged detail view in side elevation looking from the left. Fig. 7 is a horizontal section taken on line Y, Fig. 6.

Similar characters of reference indicate corresponding parts.

1 represents the base, which supports the machine. Secured to this base by bolts 3, Fig. 4, is a plate 2, which supports the pedestal 4, said pedestal being centered by means of the downward projection 5, which extends through a corresponding central opening in the plate. The pedestal is provided with an annular flange 6, upon which the sleeve 7 rests rotatively, and is set at any degree in the circle by registering it with the friction dial-ring 8, Figs. 1, 2, and 4, which is made rigid with the pedestal by a suitable set-screw 9. Projecting forward from and integral with the sleeve or hub 7 are knees 10, preferably two in number, for supporting the bed which sustains the slide for supporting the table, all as below described. The rotative hub 7 is locked at any desired position with relation to the dial by an ordinary clamp-screw 11, Fig. 1, the arm 12 of which tightens the ears 13 and causes the sleeve to bind on the pedestal. Seated on this pedestal and secured thereto by suitable bolts 14 is the frame 15, whose lower end is formed with a downwardly-projecting annular flange 16, which operates to prevent dust and grit from lodging on the upper end of the sleeve or hub 7. The frame or standard 15 is formed up into the two arms 17, each of which is curved or bent back rearwardly from the portion 15 and from each of which extends rearwardly a horizontal supporting-arm 18, sustaining the shaft 19, which is connected with the power. A pulley 20 on the shaft 19 is connected by a belt 21, Figs. 1, 2, and 3, with a pulley 22 on a spindle 23, Fig. 2, having its bearings in arms 24, which are integral with the upwardly-extending vertical holder 25, Figs. 2, 3, 4, 6, and 7. This holder is provided with one or more rows of vertically-arranged teeth 26, constituting racks, which are engaged by gear-wheels 27, Fig. 7, on the stud 28, provided at its outer end with a hand-wheel 29 and having its bearings in the vertical bracket 30, bolted at 31 to the horizontal base 32, which is rigidly secured to and supported by the frame 17. This base is integral with a web 33, and both the base and web are integral with the tubular post 34, through which the holder 25 extends and which is adapted to hold said post rigidly by means of a suitable clamping-screw 35. This tube is provided with a suitable opening in its side, through which the gear-wheels 27 extend into engagement with the rack. The vertical movement of the holder 25 is guided by a suitable key 36, Fig. 7. A cover 37, Fig. 1, is provided for the holder 25 in order to keep out dirt and grit, said cover being represented in Fig. 3 as having been removed. Pivotally supported at 38 in the bracket 30 is a swinging arm or plate 39, slotted at 40, and thereby adjustably secured rigidly by means of the bolt 41 in the desired position on the bracket 30. (See Figs. 1, 6, and 7.) Supported by and having its bearings in this swinging arm is a stud 42, provided with a hand-wheel 43, said stud engaging by an ordinary worm-gear 44 with the stud 28.

The spindle 23 has fast on it a pulley 45, which is adapted to be connected by a belt 46 with a spindle 47, whose outer end is provided with an emery-wheel 48 for grinding internal work. The supporting mechanism of this spindle is described below. In practice when the machine is started and before the spindle and emery-wheel 47 48 have attained their highest speed but a comparatively slight tension is needed on the belt to keep it from slipping on the pulley; but after the machine has attained its proper speed and the emery-wheel is ready to be applied to the work I desire to apply greater pressure to the belt 46 in order to overcome the resistance of the friction of the emery-wheel on the tool to be ground. In order to apply this additional tension to the belt, I first loosen the screw 41 and allow the arm 39 to drop, thus disengaging the worm-gear, and then lift the holder 25 in the arms 24, in which the spindle 23 has its bearings, by turning the hand-wheel 29, by means of which the gear-wheels 27 act on the racks 26, and then holding it in position by means of the clamping-screw. Having thus adjusted the belt, if a more exact adjustment is desired the clamp 35 and screw 41 are loosened and the worm-gear 44 put into engagement, when the hand-wheel 43 may be turned and the stud 28 adjusted to a nicety, thus bringing the holder 25 to the exact height desired and increasing or decreasing the tension of the belt 46, as required.

The spindle 47 is adjustably supported in the usual manner in the jaws 49 of the arm 50, whose hub 51 is adjustably supported rotatively by means of suitable ears 52 and a clamp-screw 53 to the horizontal arm 54, detachably sustained by the frame 15. Thus the spindle 47 is supported from the firmest and most rigid portion of the frame of the machine at a point near the base where there cannot possibly be any spring, and when the arm 50 is once adjusted on a particular machine further adjustment is usually unnecessary under any circumstances, all further adjustments being for tightening the belts under speed and in the manner above described. Hence the holder for the spindle 47 after having been once adjusted needs no readjustment without regard to the position of the table, the head-stock, the belt-tightening mechanism, or any other part of the machine. In other words, the spindle does not lose its position when the belt is tightened or any other part of the machine adjusted.

55 represents the head-stock, constructed in the main as usual and clamping the box 56, forming a bearing for a spindle, upon which the pulley 57 is fast, said pulley being integral or rigid with the chuck 58. This pulley is adapted to be connected to the power in any suitable manner. The mechanism for clamping the head-stock on the box 56 comprises the lips or flanges 59 60, (see Fig. 5,) the vertical pin 61, extending through said lips and engaging the under lip by means of the threaded portion 62, the annular flange or collar 63, rigid on the pin between the lips, the thimble or case 64, surrounding the pin above the lip 60, the handle 65, extending through the thimble into the pin, a bushing 66, surrounding the pin within the upper lip, and a suitable set-screw 67, extending through the lip against said bushing. To clamp the head-stock more tightly on the box, the screw is turned to the right by the handle 65, which rotates with it the thimble 64, and thus forces the lip 60 down toward the lip 59. When the clamp is to be loosened, the handle is rotated in the reverse direction, thus releasing the lip 60 and lifting the collar or flange 63 up toward or against the upper lip. The head-stock is supported in the longitudinal groove 68, reverse-T-shaped in cross-section, in the surface of the table 69, suitable clamping mechanism 70 being employed to hold the head-stock in any desired position in the groove. This table is centrally pivoted at 71, Fig. 4, to the bed 72, and said bed is formed on its under side with a longitudinal slide 73, which extends into a corresponding longitudinal groove 74 in the under bed 75, and is furthermore provided with an overlapping dust-guard 76 on its rear side. The under bed 75 is formed with rearward extensions 77, Fig. 3, and the entire bed slides rearward and forward in the machine in suitable ways. The under bed 75 is reciprocated rearward and forward in the machine, carrying with it the upper bed 72 and the table 69 by means of the screw 79, which screws into the bar 80, making a portion of the frame of the machine. The forward portion of this screw is provided with a suitable flange 81 behind its bearings in the dust-guard 82 and with a hand-wheel 83. By rotating this wheel the lower bed is moved laterally in the machine rearward and forward, carrying with it the upper bed 72 and table 69. (See Fig. 4.) The dust-guard, in which this screw has its bearings, is of substantially the shape shown in Fig. 4 and is secured by suitable screws 84 to the front of the bed 75, as shown in Figs. 1, 3, 4, and 5, but not in Fig. 2, as it is removed in that figure. This guard is for the purpose of preventing all grit, dust, or bits of steel from collecting upon or fouling the screw 79 or any of the parts below the table which move in relation to each other.

Secured longitudinally to the under side of the under bed 72, near the rear portion thereof, is a rack 85, having teeth on its front surface, as indicated in Figs. 4 and 5. Meshing into this rack is a gear-wheel 86, keyed to a vertical shaft 87, having its bearings in the under bed 75, as indicated in Fig. 5. Loose on this shaft is a tapered hub 88, split at 89 and threaded at 90. Integral with this hub is the worm-gear 91. A clamping-wheel 92 is internally threaded and cone-shaped to engage and fit upon the cone-shaped hub 88. By rotating this hand-wheel the hub 88 is contracted and clamps the stud 87, thereby rotating it. The hub 88 rests upon a collar 93 on the stud. The worm-gear 91 is engaged by the worm 94 on the transverse shaft 95, which has its bearings in the box 96, extending horizontally forward from a plate 97, Figs. 1 and 3, bolted to the lower bed at the right of the dust-guard 82. To slide the bed 72 longitudinally, the hand-wheel 98 is rotated, thus engaging, through the mechanism above described, the stud 87 and by means of the gear-wheel 86 engaging the rack 85. By means of this mechanism a slow but exact longitudinal adjustment, which is also a lock, is provided for the bed 72. In order to furnish a quick adjustment for the same bed, I provide a shaft 99, supported in a bearing 100, extending from a plate 101, secured to the front of the machine at the left of the dust-guard 82. (See Figs. 2, 3, 4, and 5.) This shaft is provided with a hand-wheel 102 at its outer end and at its inner end with a gear-wheel 103, Figs. 1 and 4, which engages with teeth 104, Figs. 4 and 5, on the under side of the rack 85. Thus quick longitudinal movement may be imparted to the bed 72. The front edge of the bed 72 is provided with a grooved way 105, from which a bolt 106 extends forward, whereby the longitudinal movement of the table may be limited by means of any suitable contrivances projecting up from the dust-guard 82.

From the opposite ends of the table 69 project wings 107 and 108, each provided with a slot 109 on the arc of the circle of which the pin 71 is the center, said slotted wings being preferably protected by suitable covers 110, (one only being shown in Fig. 3.) Clamping-bolts 111 extend from the bed 72 up through said slots, thus limiting the rotative movement of the bed. Said bolts, however, are removable, so that the bed can be rotated on a longer arc, if desired. A bracket 112, Figs. 1, 2, and 3, projects from the right end of the bed 72, and resting upon this bracket is a plate 113, provided with a slot 114, which is concentric and of substantially equal length with the slot 108. A clamping-bolt 115 secures the plate adjustably to the bracket 112. The plate is substantially C-shaped and arranged as shown, whereby an arm 116 extends into the space formed by the C-shaped plate over the bracket, and set-screws 117 extend through the plate horizontally and set against opposite sides of the arm. It will be seen, therefore, that the table 69 is rotative adjustably for the length of the slots 109 with relation to the bed 72, that it is further rotative adjustably with relation to the bed 72 for the length of the space between the ends of the C-shaped plate 113 less the width of the arm 116, that the table 69 and bed 72 are adapted to slide longitudinally on the bed 75 for substantially the entire length of the table or for so much less its entire length as is desired, and that the table and two beds 72 and 75 can be moved laterally—that is, backward and forward—in the ways 78. Thus the table is rotative to the extent of the length of the slots 108, or to the extent of the combined length of one of the slots 108 and the inside of the plate 113, or to any greater extent by removing the clamping-bolts, or it is adjustable longitudinally or transversely. Moreover the longitudinal adjustment may be a quick adjustment by operating the wheel 102, and there is in addition a slow and exact adjustment produced by the operation of the wheel 98.

On the shaft 23 is an emery wheel or grinder 118 for grinding surfaces which are supported in the usual manner in the head-stock 55 after the chuck 58 has been removed. When this emery-wheel is to be used, the arms 50 and 54, the latter of which is supported in a socket 119, Figs. 2 and 4, are removed from the machine, together with the belt and pulley 45 and 46. The chuck 58 is then removed and the tool to be ground applied to the head-stock. The shaft 23 is then lowered in order to drop the grinding-wheel 118 into the proper position by releasing the swinging arm 39 and turning the wheel 29. Then if an exact adjustment is desired the slotted arm 39 is swung in, so that the worm-gear 44 may be in engagement, and the wheel 43 rotated. The counterbalance 120 is connected by a suitable chain 121 with the holder 25 in order to prevent the shaft 23 from dropping.

The operation of the holder 25, whereby the shaft 23 is raised and lowered with a grinding-wheel on either the right or left end, is of service in twist-drill grinding, disk grinding, and cutter-work of various kinds in great variety and with curved or flat surfaces, and the adjustment of the shaft in connection with the different adjustments of the table renders the grinding-wheels applicable to external work or practically any known style of tool or surface. By means of this construction, in which the frame 15 17 is recessed or bent rearward and the supporting-shaft for the grinding-wheels is in a raised position, the grinding-wheels can be lowered and brought forward to their work, no raising of the emery-wheels being necessary, they being always suspended above the work.

Having thus fully described my invention, what I claim, and desire to secure by Letters Patent, is—

1. In a tool and cutter grinding machine, the stationary frame 15 supported on a suitable pedestal and provided with the rearwardly-recessed portion 17; a vertically-adjustable holder; the horizontal spindle 23 sustained by said holder; mechanism for driving the spindle; the horizontal arm 54 supported by a socket 119 sustained by the frame; the arm 50 having its rear end adjustably rotatively supported by the arm; and suitable jaws at the outer end of said arm 50 for supporting a grinding-spindle, substantially as set forth.

2. In a tool and cutter grinding machine, the stationary frame 15 supported on a suitable pedestal and provided with the rearwardly-recessed portion 17; a vertically-adjustable holder; the horizontal spindle 23 sustained by said holder; mechanism for driving the spindle; an arm swinging vertically from the frame and adapted to support a grinding-spindle; the vertical tubular post 34 supported by the frame; the holder 25 sliding vertically in said post; mechanisms for imparting quick and slow vertical movements respectively to the holder and for locking the same at any desired height; the horizontal spindle or shaft 23 supported by the holder at its lower end; the arm 50 swinging vertically from the frame and capable of being set at any desired angle and adapted to hold the grinding-spindle; and a pulley on said spindle or shaft 23, whereby rotation is communicated to the grinding-spindle by means of a belt, whereby the spindle or shaft 23 may be raised by lifting the holder, and pressure applied to the belt at speed, substantially as described.

3. In a tool and cutter grinding machine, the stationary frame 15 supported on a suitable pedestal and provided with the rearwardly-recessed portion 17; a vertically-adjustable holder; the horizontal spindle 23 for supporting a grinding-wheel for external work; a suitably-supported grinding-tool for internal work, said spindle being in a raised position whereby the emery-wheels are always suspended above the work; mechanism for lowering the holder which sustains the spindle; and mechanism for driving the spindle, substantially as set forth.

4. In a tool and cutter grinding machine, the frame; the under bed 75 sliding in the frame; mechanism for imparting lateral or backward-and-forward movement to the bed; the upper bed 72 sliding on the bed 75; mechanism for imparting quick and slow longitudinal movements as desired thereto with relation to the under bed 75; and the table 69 supported by the bed 72 and adapted to rotate thereon, substantially as described.

5. In a tool and cutter grinding machine, the frame; the under bed 75 sliding in the frame; mechanism for imparting lateral or backward-and-forward movement to the bed; the upper bed 72 sliding on the bed 75; mechanism for imparting quick and slow longitudinal movements as desired thereto with relation to the under bed 75; the table 69 rotatively supported by the bed 72; the wings 107 and 108 extending horizontally from the opposite ends of the table and provided with the curved slots 109; clamping-bolts extending from the bed 72 up through said slots; the plate 113 supported by a bracket extending from one end of the bed, said plate being located beyond one of said wings and provided with a slot which is concentric with the slot in said wing; a clamping-bolt extending through the slot in the plate to the bracket; an arm extending horizontally from the wing toward the plate; and set-screws extending horizontally from the plate on opposite sides of and against said arm, substantially as set forth.

6. In a tool and cutter grinding machine, the head-stock 55 provided with the lips 59 and 60; the vertical pin 61 extending through said lips and engaging the under lip by means of its threaded portion; the annular flange or collar 63 rigid on the pin between the lips; the thimble or case 64 surrounding the pin above the upper lip; the handle 65 on the pin; the bushing 66 surrounding the pin within the upper lip; and a suitable set-screw extending through the upper lip against said bushing, substantially as described.

In testimony whereof I have signed my name to this specification in the presence of two subscribing witnesses.

JOHN BATH.

Witnesses:
HENRY W. WILLIAMS,
A. N. BONNEY.